(12) United States Patent
Erb

(10) Patent No.: US 8,905,066 B2
(45) Date of Patent: Dec. 9, 2014

(54) PRESSURE-LIMITING VALVE

(75) Inventor: Ulrich Erb, Köln (DE)

(73) Assignee: VOSS Automotive GmbH, Wipperfürth (DE)

( * ) Notice: Subject to any disclaimer, the term of this patent is extended or adjusted under 35 U.S.C. 154(b) by 87 days.

(21) Appl. No.: 13/469,324

(22) Filed: May 11, 2012

(65) Prior Publication Data

US 2012/0285556 A1   Nov. 15, 2012

(30) Foreign Application Priority Data

May 11, 2011   (DE) .......................... 10 2011 101 258

(51) Int. Cl.
  *F16K 21/10*   (2006.01)
  *F16K 17/04*   (2006.01)
  *F02M 37/00*   (2006.01)
(52) U.S. Cl.
  CPC ......... *F16K 17/0406* (2013.01); *F16K 17/0433* (2013.01); *F02M 37/0029* (2013.01); *F02M 37/0041* (2013.01); *F02M 37/0052* (2013.01)
  USPC .............. 137/514.5; 137/533.15; 137/533.17; 137/539.5
(58) Field of Classification Search
  CPC . F16K 15/021; F16K 15/044; F16K 17/0406; F16K 47/00; F16K 47/02; F16K 47/04
  USPC ............ 137/469, 514, 514.5, 533.11, 533.15, 137/533.17, 539.5
  See application file for complete search history.

(56) References Cited

U.S. PATENT DOCUMENTS

| 2,415,258 | A | * | 2/1947 | Parker et al. ................ 137/539.5 |
| 4,474,208 | A | * | 10/1984 | Looney .................... 137/516.29 |
| 4,566,486 | A | * | 1/1986 | Taylor et al. .................. 137/469 |
| 5,251,664 | A | * | 10/1993 | Arvidsson et al. ............ 137/514 |
| 6,244,295 | B1 | * | 6/2001 | Bartussek et al. ............ 137/540 |
| 7,311,118 | B2 | * | 12/2007 | Doutt ......................... 137/539.5 |

(Continued)

FOREIGN PATENT DOCUMENTS

| DE | 43 11 856 | 10/1994 |
| DE | 101 52 647 | 7/2002 |
| DE | 10 2004 041 2 | 3/2006 |
| DE | 10 2006 040 0 | 2/2008 |

OTHER PUBLICATIONS

Machine Translation of DE102006040055 A1 (Feb. 28, 2008)(ZF Lenksysteme GMBH) (from EPO website Nov. 29, 2013).*

*Primary Examiner* — Craig Schneider
*Assistant Examiner* — Jessica Cahill
(74) *Attorney, Agent, or Firm* — Brinks Gilson & Lione

(57) ABSTRACT

The invention relates to a pressure limiting valve, in particular for placement in a return line of a common-rail-system of a combustion engine, with an elongate valve housing having an axial inlet opening present on one front end, and at least one outlet opening axially separated from the inlet opening. An interior valve seat for a ball-shaped valve body connects to the inlet opening, whereby a valve piston is positioned between the valve body and a closing spring producing a closing force. An integrated hydraulic throttle dampens the movement of the valve piston in the valve closing direction. A valve-seat insert part has a ring-shaped body with an inlet opening formed on a front end, with the conically expanding valve seat connecting to the inlet opening, as well as with a throttle section with a cylindrical interior area connecting to the valve seat.

8 Claims, 3 Drawing Sheets

(56) References Cited

U.S. PATENT DOCUMENTS

| | | | |
|---|---|---|---|
| 7,341,075 B2 * | 3/2008 | Taylor | 137/614.2 |
| 8,360,095 B2 * | 1/2013 | Morgan et al. | 137/489 |
| 2007/0137711 A1 * | 6/2007 | Krebs | 137/454.5 |
| 2010/0276623 A1 * | 11/2010 | Talaski | 251/337 |

\* cited by examiner

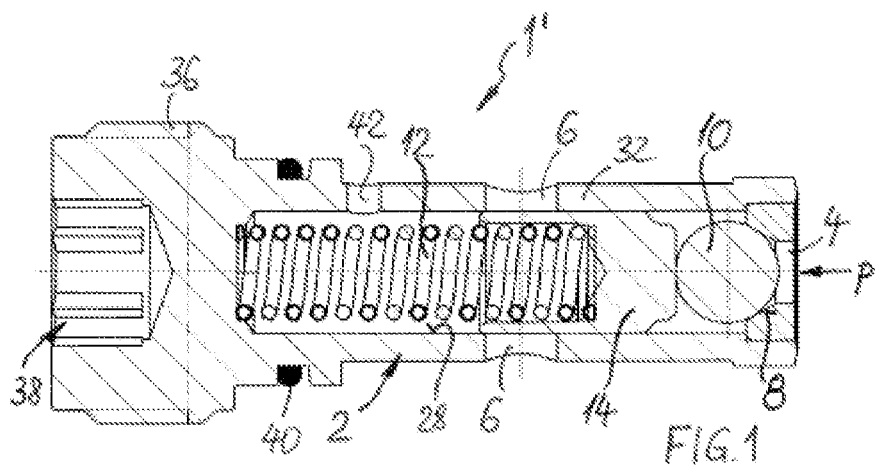
The Prior Art
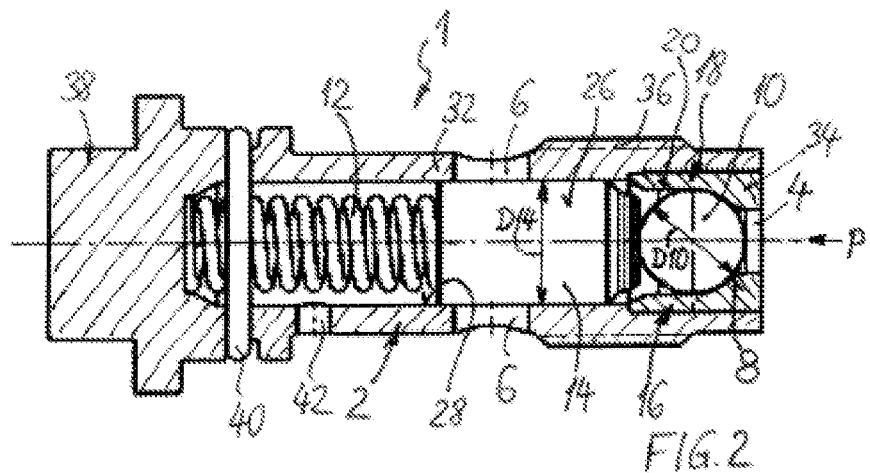

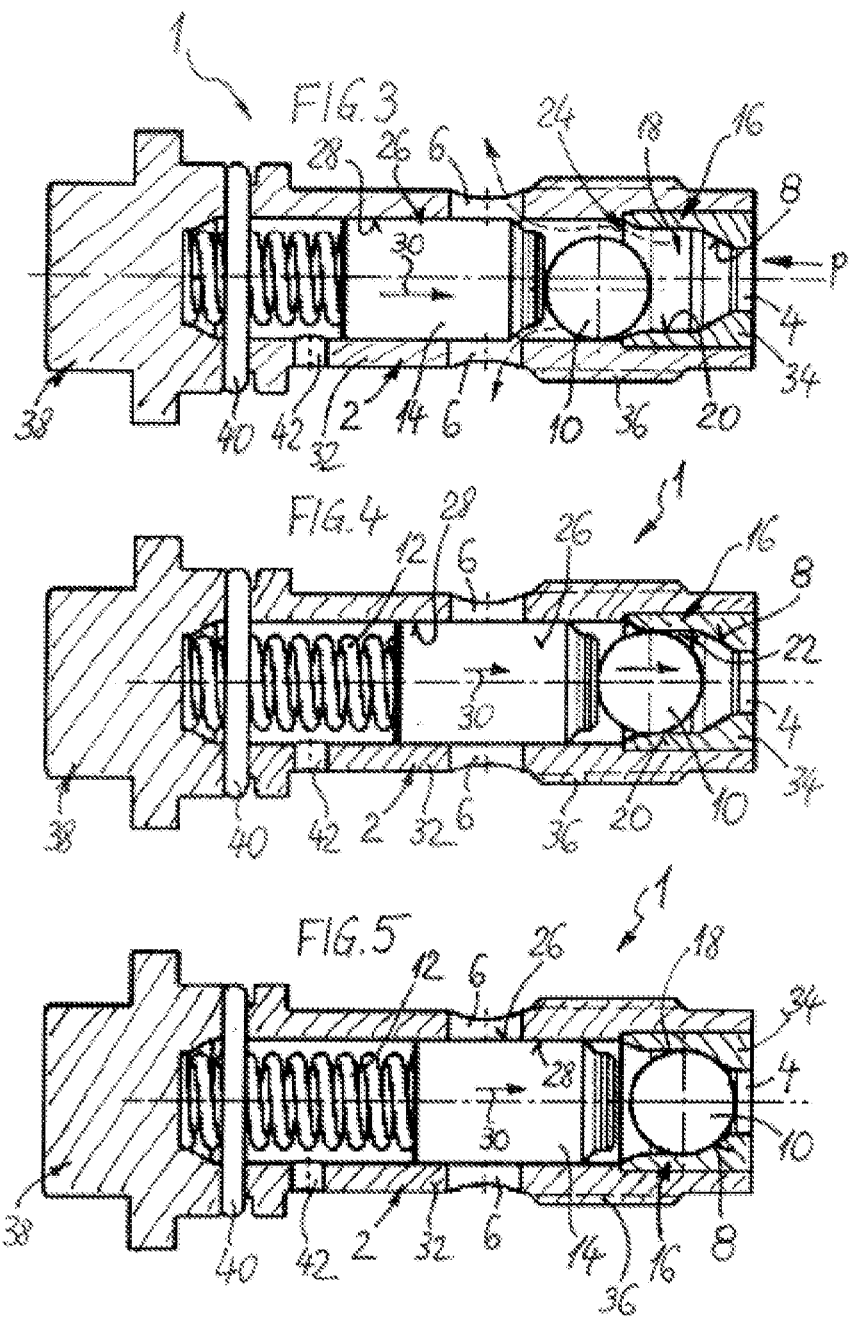

PRESSURE-LIMITING VALVE

BACKGROUND

1. Field of the Invention

This invention generally relates to pressure limiting valves. More specifically, the invention relates to pressure limiting valves having an elongate, tube-like valve housing with an axial inlet opening and at least one outlet opening axially separated from the inlet opening, and whereby an internal valve seat for a ball-shaped valve body is connected to the inlet opening and whereby a valve piston is positioned between the valve body and a closing spring that produces a closing force.

2. Related Technology

Pressure limiting valves of the general type to which the present invention relates are used in fuel return lines by so-called common-rail-systems of combustion engines. Such a common-rail-system features a pressure line, the so-called rail for several injectors. Fuel under high pressure is supplied via the pressure line and can be injected in a dosed manner via the injectors into the combustion engine. The non-injected fuel is sent via the return line into the vacuum line of the fuel pump or into the tank. In the process it is generally necessary to maintain a certain minimum pressure in the low pressure range of the injectors. To that end a pressure limiting valve of the above general type is emplaced in the return, frequently also called a pressure maintenance valve which has the described objective of holding the pressure of the fuel in the low pressure range of the injectors at a defined value or limiting it to this defined value.

It has been seen in practice that under certain operating conditions damage or even total failure to the pressure maintenance valve can occur.

In view of the above, improving the operational security of a pressure limiting valve of the type described and, as a result, avoiding damage or even total failure is desirable.

SUMMARY

Accordingly, a pressure limiting valve, as disclosed herein, is equipped with an integrated hydraulic throttle to dampen the movement of the valve body in the valve closing direction. This inventive design is based on a finding that the damage found in known valves can be attributed to abrupt valve movements caused by excitations during the injection cycle of the combustion engine and, quite in particular, to the rapid and abrupt closing movements. These abrupt movements are effectively dampened in accordance with the present invention, in that primarily the spring-loaded valve piston is hydraulically braked in its closing movement.

In accordance with one aspect of the present invention, a pressure limiting valve for placement in a return line of a common-rail-system of a combustion engine is provided. The pressure limiting valve includes an elongate valve housing with an axial inlet opening present on one front side and connected by a housing passageway to at least one outlet opening that is axially separated from the inlet opening. A ball-shaped valve body is located in the housing passageway and engages with an interior valve seat that connects to the inlet opening. A valve piston is positioned within the housing passageway between the valve body and a closing spring, the latter of which engages the valve piston producing a closing force. Additionally, an integrated hydraulic throttle is provided in the housing passageway and dampens movement of the valve piston in the valve closing direction.

In another aspect of the invention, the hydraulic throttle is formed by a throttle section connect to the valve seat on a side of the valve seat facing the valve piston, whereby the throttle section exhibits a cylindrical interior area with an interior diameter adapted to an exterior diameter of the valve body forming a circumferential throttle gap between the valve body and the interior area of the throttle section.

In a further aspect of the invention, the throttle section is axially dimensioned such that a valve open position of the valve body is positioned at least primarily outside the throttle section to release a flow outlet.

In yet another aspect of the invention, the valve piston has a cylindrical exterior and is axially displaceable with little circumferential free play in a cylindrical interior area of the housing passageway.

In still another aspect of the invention, the valve piston exhibits an exterior cross-section that is larger than an exterior cross-section of the valve body.

In an additional aspect of the invention, the outlet opening is positioned as a radial opening in a circumferential wall of the valve housing wherein the valve piston releases the outlet opening into an open position at least area-wise in a direction proceeding from the inlet opening and the valve piston covers the outlet opening in a closed position.

In a further aspect of the invention, the valve seat and the throttle section are formed in a ring-like insert part secured in a valve housing.

In yet a further aspect of the invention, the valve housing is constructed as a hollow screw with an exterior threading, an exterior circumferential seal and with a force engagement for a radial tool, the force engagement lying axially opposite the inlet opening.

In still a further aspect of the invention, the pressure limiting valve includes a valve-seat insert part having a ring-shaped body defining the inlet opening, the valve seat, and a throttle section of the hydraulic throttle, the throttle section having a cylindrical interior area.

In an additional aspect of the invention, the valve-seat insert part includes a radially increasing inflow area connected to the cylindrical interior area of the throttle section.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 1 shows a known pressure limiting valve corresponding to the prior art in an axial view and in its closed position caused by spring force.

FIG. 2 illustrates a pressure limiting valve, embodying the principles of the present invention, in a partial axial view, likewise in the closed position.

FIG. 3 the pressure limiting valve according to FIG. 2 in an opened position caused by an opening pressure p.

FIGS. 4 and 5 illustrate additional views of the pressure limiting valve of FIGS. 2 and 3 in various positions during a closing process in transition from the open position according to FIG. 3 to the closed position of FIG. 2.

DETAILED DESCRIPTION

Figure 6:
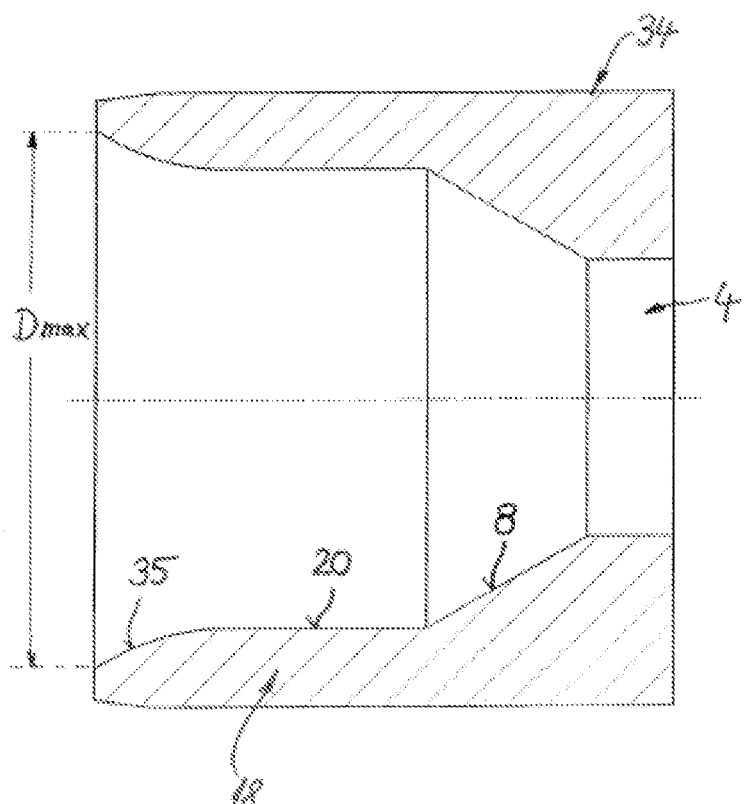
FIG. 6 is an axial cross sectional view of a reinforced insertion part illustrating the valve seat and a throttle section.

In the various figures of the drawings the same or functionally corresponding parts are always provided with the same reference designation. This also applies to the prior art embodiment seen in FIG. 1.

It is expressly emphasized in the following description that the invention is not limited to the embodiments and thereby not to all or several features of the described feature combinations, moreover each individual partial feature of the/each embodiment can have an inventive significance disassociated from all others in conjunction with the described partial features, individually and also in combination with any features of another embodiment.

The inventive pressure limiting valve 1 of FIG. 2, similar to the known pressure-limiting valve 1' of FIG. 1, includes an elongate, tube-like valve housing 2 with an axial inlet opening 4 present on a front end and at least one in particular outlet opening 6 axially separated from the inlet opening 4. An internal, conical valve seat 8 for a ball-shaped valve body 10 connects to the inlet opening 4. Placed between the valve body 10 and a closing spring 12, which produces a closing force, is a valve piston 14 that is movably guided in an axial manner. This valve piston 14 acts to close against the valve body 10 in order to press it into the valve seat 8 and as a result close the inlet opening 4. Preferably the valve body 10 and the valve piston 14 are constructed as two separate individual parts. The valve is so emplaced in a fuel return line (not illustrated) that it is impacted via the inlet opening 4 with a pressure p, which prevails inside the return line. In the process the valve is so designed with respect to the closing force of the closing spring 12 that it opens at a certain pressure p, in that the valve body 10 lifts from the valve seat 8 against the closing force. The pressure p, then further acts against the valve piston 14 so that this too is pushed against the closing force until the outlet opening 6 is at least partially released and thereby opened.

The inventive pressure limiting valve 1 shown in FIGS. 2 to 5, and as thus far described, corresponds to the known valve 1' according to FIG. 1. In addition, an integrated hydraulic throttle 16 to dampen the movement of the valve piston 14 in the valve closing direction is now provided in the invention.

In a preferred embodiment the throttle 16 is formed by a throttle section 18 connecting to the valve seat 8 on its side facing the valve piston 14 which features a cylindrical interior area 20—see FIG. 3 in particular—with an interior diameter so adapted to the exterior diameter of the ball-shaped valve body 10 that—when the valve body 10 is located in the area of the throttle section 18—a circumferential throttle gap 22 is formed between the valve body 10 and the interior area 20 of the throttle section 18. Reference is thereby made in particular to the depiction in FIG. 4.

The throttle section 18 is so dimensioned with regard to the axial length of the interior area 20 such that in the valve open position (see FIG. 3) the valve body 10 is positioned at least primarily outside the throttle section 18 to release a flow outlet 24.

The valve piston 14 is designed with a cylindrical exterior area 26 with a low circumferential play so as to be displaced axially in a cylindrical interior area 28 of the valve housing 2. The invention hereby provides that the valve piston 14, when viewed in a cross-section perpendicular to the longitudinal axis, features an outer cross-section area which is larger than the outer cross-section area of the valve body 10. Concretely this means that, on the one hand, the outer diameter D10 of the ball-shaped valve body 10 is smaller than the outer diameter D14 of the valve piston 14 (see FIG. 2) and, on the other hand, the interior diameter of the cylindrical interior area 20 of the throttle section 18 is likewise smaller than the interior diameter of the cylindrical interior area 28 of the valve housing 2.

By means of the described inventive embodiments the following function of the valve occurs upon closing. Starting from the open position seen in FIG. 3 which was reached by the application of pressure p, from the closed position of FIG. 2, the valve piston 14 is displaced by the force of the closing spring 12 into the closed position in the direction of the arrow 30 with the lowering of the pressure p from a certain pressure value. As a result the valve piston 14 also pushes directly against the valve body 10 in the closing direction until the valve body 10 moves into the area of the throttle section 18 according to FIG. 4. From this position the hydraulic flow rate is limited in the direction of the inlet opening 4 to the size of the throttle gap 22. During the ongoing closing movement there then results the inventive effect that the valve body 10 is accelerated with respect to the valve piston 14, because the valve piston 14 compresses a greater volume of the fuel present in the valve per segment section than does the valve body 10 because of the cross-sectional difference of the valve piston 14. Consequently, the valve body 10 is hydraulically pressed away from the valve piston 14 and into the valve seat 8, as depicted in FIG. 5; as a result it lifts or separates axially from the valve piston 14, see FIG. 5. Consequently, the valve body 10 already attains a sealing position in the valve seat 8 during the closing movement of the valve piston 14. The volume of fuel present in this state between the valve piston 14 and the valve body 10 can then no longer be freely compressed via the inlet opening 4, but instead it must mainly be compressed from the space between the valve body 10 and the valve piston 14 by the system-related gap between the valve piston 14 and the valve housing 2 to the outlet opening 6 and, if necessary, to a lesser extent also via the area of the valve seat 8. This causes a very effective damping and braking of the subsequent closing movement of the valve piston 14 until it makes mechanical contact with the valve body 10, so that hard impacts in the closing direction and the resulting damage can be effectively avoided.

In another preferred embodiment of a pressure limiting valve 1 incorporating the principles of the present invention, each of preferably two diametrically opposed outlet openings 6 are positioned as a radial opening in a circumferential wall 32 of the valve housing 2. Thus the outlet openings 6 and the valve piston 14 are so arranged relative to each other that the valve piston 14 releases the outlet openings 6 into an open position at least area-wise in the direction of the inlet opening 4 (see FIG. 3) and covers it like a washer in the closed position (see FIGS. 2, 4 and 5).

In another preferred embodiment the valve seat 8 and the connecting throttle section 18 are constructed with a cylindrical interior area 20 in a ring or casing-like insert part 34 secured in the valve housing 2. This insert part 34 is especially depicted and enlarged in FIG. 6. Accordingly the conically expanding valve seat 8 is connected thereon, starting from the inlet opening 4, and the cylindrical interior area 20 of the throttle section 18 is adjoined thereon. The interior area 20 preferably expands on its side opposite the valve seat 8 across a crater-like inflow area 35 for the valve body 10 up to a largest diameter $D_{max}$, which corresponds approximately to the interior diameter of the interior area 28 of the valve housing 2 in order to ensure that the ball-shaped valve body 10 is guided from its open position (FIG. 3) unimpeded into the cylindrical interior area 20 of the throttle area 18 when closing (see FIGS. 3 and 4). The inflow area 35 preferably has a convex rounded arch when viewed in an axial cross section, but it can also be designed as a conical expansion. This embodiment has a positive influence on the flow features in the open position according to FIG. 3.

The valve housing 2 is designed as a so-called hollow screw with an external thread 36 extending over at least a partial length thereof, and a force engagement 38 lying axially opposite the inlet opening 4 for a rotating tool (not illustrated) as well as an outer circumferential seal 40 in the area between the outlet opening 6 and the force engagement 38. The valve 1 can thus be so screwed into a recess (not illustrated) that it lies above the inlet opening 4 and the outlet opening(s) 6 in the return line. According to FIGS. 2 to 5 the force engagement 38 can be constructed as an exterior engagement, like, for example, as an exterior hexagon or alternatively also, corresponding to FIG. 1, as an interior engagement, like, for example, an interior hexagon or interior star. In an axial area of the valve housing 2 accommodating the closing spring 12 lying between the valve piston 14 and the closed front side of the valve housing 2 there is at least one radial relief opening 42 in its perimeter wall 32, in order to facilitate the opening movement of the valve piston 14 in that the fuel contained in the space accommodating the spring 12 can escape and also be sent back to the tank.

Finally some dimensions should be provided for a preferred, concrete embodiment of the inventive valve 1 as an example, whereby these dimensions, of course, cannot limit the invention:

The ball-shaped valve body 10 can have an outer diameter of 8 mm. With an interior diameter 20 of the throttle section 18 of 8.03 to 8.1 mm, there results for the throttle gap 22 across the longitudinal circumference a radially measured gap width of 0.015 mm to 0.05 mm. The exterior diameter of the valve piston 14 as well as the interior diameter of the housing interior area 28 amount to 9.6 mm, whereby the tolerances in any event are so designed that there is in any case a sufficient free movement. With these preferred dimensions the cross-sectional area of the valve body 10 amounts to $A_{10}=(\pi/4)(8\ mm)^2=50.27\ mm^2$ and the cross-sectional area of the valve piston 14 $A_{14}=(\pi/4)(9.6\ mm)^2=72.38\ mm^2$.

The/each outlet opening 6 has a diameter which in any event is larger than the diameter of the inlet opening 4. Preferably the/each outlet opening 6 has a diameter of 5.7 mm and the diameter of the inlet opening 4 is preferably 4.9 mm. The diameter of the relief opening preferably amounts to 1 mm to 2.5 mm. The exterior threading 36 of the inventive embodiment according to FIGS. 2 to 5 can be designed as M16. The entire length amounts to 54 mm.

The invention is not limited to the depicted and described embodiments but includes all similarly functioning embodiments in the sense of the invention. Thus the valve body 10 and the valve piston 14 can be rigidly connected to each other, e.g. be constructed as a single piece. In this case the damping is attained solely via the throttle gap 22.

It is expressly emphasized that the embodiments are not limited to all features in combination; moreover each individual partial feature can also have an inventive significance separately from all other partial features. Furthermore the invention is not limited to the combination of features, but instead can be defined by any other desired combination of definite features of all disclosed individual features. This means that basically any practical individual feature can be omitted or can be replaced by at least one individual feature disclosed elsewhere in the application.

I claim:

1. A pressure limiting valve for placement in a return line of a common-rail-system of a combustion engine, the pressure limiting valve comprising: an elongate valve housing with an axial inlet opening present on one front side and connected by a housing passageway to at least one outlet opening axially separated from the inlet opening, a ball-shaped valve body located in the housing passageway engages with an interior valve seat that connects to the inlet opening and a valve piston is positioned within the housing passageway between the valve body and a closing spring that engages the valve piston producing a closing force, the outlet opening is positioned as a radial opening in a circumferential wall of the valve housing, and wherein the valve piston completely covers the outlet opening in a closed position and releases the outlet opening into an open position upon movement in a direction proceeding from the inlet opening, an integrated hydraulic throttle provided in the housing passageway and dampening movement of the valve piston in the valve closing direction, the hydraulic throttle is formed by a throttle section connecting to the valve seat on a side of the valve seat facing the valve piston, whereby the throttle section exhibits a cylindrical interior area with an interior diameter adapted to an exterior diameter of the valve body forming a circumferential throttle gap between the valve body and the interior area of the throttle section.

2. The pressure limiting valve according to claim 1, wherein the throttle section is axially dimensioned so that a valve open position of the valve body is positioned at least primarily outside the throttle section to release a flow outlet.

3. A pressure limiting valve according to claim 1, wherein the valve piston has a cylindrical exterior and is axially displaceable within a cylindrical interior area of the housing passageway.

4. The pressure limiting valve according to claim 1, wherein the valve piston exhibits an exterior cross-section that is larger than an exterior cross-section of the valve body.

5. The pressure limiting valve according to claim 1, wherein the valve seat and the throttle section are formed in a ring-shaped insert part secured in the valve housing.

6. The pressure limiting valve according to claim 1, wherein the valve housing is constructed as a hollow screw with an exterior threading, an exterior circumferential seal and with a force engagement for a radial tool, the force engagement lying axially opposite the inlet opening.

7. The pressure limiting valve according to claim 1, further comprising a valve-seat insert part having a ring-shaped body defining the inlet opening, the valve seat, and a throttle section of the hydraulic throttle, the throttle section having a cylindrical interior area.

8. The pressure limiting valve according to claim 7, wherein the valve-seat insert part includes a radially increasing inflow area connected to the cylindrical interior area of the throttle section.

* * * * *